United States Patent
Takinami

[19]
[11] Patent Number: 6,016,110
[45] Date of Patent: Jan. 18, 2000

[54] MAP DISPLAY DEVICE, MAP DISPLAY METHOD, NAVIGATION DEVICE AND AUTOMOBILE

[75] Inventor: Takashi Takinami, Chiba, Japan

[73] Assignee: Sony Corporation, Tokyo, Japan

[21] Appl. No.: 08/998,901

[22] Filed: Dec. 29, 1997

[30] Foreign Application Priority Data

Mar. 26, 1996 [JP] Japan .................................. 8-348812

[51] Int. Cl.[7] .................................................. G08G 1/123
[52] U.S. Cl. ...................... 340/995; 345/123; 345/124; 345/125
[58] Field of Search .................................. 340/990, 995, 340/988; 345/123, 124, 125, 159, 341; 701/208

[56] References Cited

U.S. PATENT DOCUMENTS

| | | | |
|---|---|---|---|
| 4,786,895 | 11/1988 | Castaneda | 345/123 |
| 5,059,965 | 10/1991 | Geiser | 340/995 |
| 5,179,648 | 1/1993 | Hauck | 345/123 |
| 5,434,591 | 7/1995 | Goto et al. | 340/995 |
| 5,495,566 | 2/1996 | Kwatinetz | 345/123 |
| 5,508,717 | 4/1996 | Miller | 345/145 |
| 5,526,481 | 6/1996 | Parks et al. | 345/163 |
| 5,774,828 | 6/1998 | Brunts et al. | 340/995 |
| 5,787,383 | 7/1998 | Moroto et al. | 340/995 |
| 5,832,408 | 11/1998 | Tamai et al. | 340/995 |

FOREIGN PATENT DOCUMENTS 2037394  2/1990  Japan .................................. 345/124

*Primary Examiner*—Brent A. Swarthout
*Attorney, Agent, or Firm*—Jay H. Maioli

[57] ABSTRACT

When scrolling a display range of a map in a navigation device or the like, the display state can be satisfactorily scrolled. The range displayed as a map is continuously changed on the basis of a specified operation, and the speed to change the display range is arranged to be gradually increased from the initial speed at the starting time of the specified operation, to the specified terminal speed at a previously set specified acceleration.

10 Claims, 8 Drawing Sheets

MAP DISPLAY DEVICE, MAP DISPLAY METHOD, NAVIGATION DEVICE AND AUTOMOBILE

BACKGROUND OF THE INVENTION

The present invention relates to a map display device and a map display method for displaying various maps such as a road map or the like, a navigation device to which the map display device is applied, and an automobile equipped with the navigation device.

Various types of navigation devices to be mounted on an automobile or the like are developed. The navigation device comprises a large capacity data storage means such as a CD ROM or the like in which, for example, road map data are stored, a detecting means for detecting the present position, and a display device for displaying the road map of the place near the detected present position on the basis of the data read out from the data storage means. In this case, as the detecting means for detecting the present position, there are a means using a global positioning system (hereafter referred to simply as a GPS) utilizing an artificial satellite for positioning, which is called a GPS (Global Positioning System), a means by the autonomic navigation in which the change of the present position is traced from the start point on the basis of the information such as the running direction of the vehicle or the running speed, and the like.

Then, the data of the road map of the place near the present position detected by the detecting means for detecting the present position, are read out from the large capacity data storage means such as a CD ROM or the like, and a picture signal for displaying the road map is prepared, and the picture signal is supplied to a display device, and the road map of the place near the present position is displayed thereon. There is a case where the main body of the navigation device and the display device are composed of separated bodies, too. Moreover, it is also possible to display the road map of a desired position or the like at home or the like without mounting the devices on a movable body such as an automobile or the like.

By the way, in such a navigation device, it is also possible to display a map of an arbitrary position besides a map of the measured present position by operating a control key or the like, as long as the map data are prepared by a CD ROM or the like. For example, it is possible that from the state where the road map of the place near the present position is displayed, the displayed map is scrolled in an arbitrary direction by operating a cursor key or the like so that a map of an adjacent position may be displayed.

Such a scroll of the display range of a map is a scroll in which for example, by continuously pressing a cursor key corresponding to the direction of scrolling, the display range is continuously changed in the corresponding direction while the key is continuously pressed, and in the prior art, the scroll speed during the pressing of the key is set to be constant. That is, for example, as shown in FIG. 1, the display range was changed in order at a scroll speed Va constant at all times from the start of the pressing of the key. The horizontal axis in FIG. 1 indicates the elapsed time since the start of the pressing of the key.

If the scroll speed is constant at all times like this, there is a disadvantage that for example, it takes a long time to display a map of a place far away from the present position. Therefore, a navigation device is developed, in which the scroll speed can be changed at a plurality of steps. That is, for example, as shown in FIG. 2, the scroll speed is set to be a comparatively slow scroll speed Vb until a predetermined time has been elapsed after the start of the pressing of the key, and when that time has been elapsed, it is set to be a fast scroll speed Vc, and further, when another predetermined time has been elapsed, it is set to be a faster scroll speed Vd. Thus, the scroll speed is changed at a plurality of steps, so that for example, if the key is pressed only for a short time, the display range of a map is changed at a slow scroll speed and it can be successfully performed to choose the map in the range adjacent to the range displayed at present, and if the key pressing time becomes long, the display range is scrolled at a high speed to a map in the range far away from the range displayed at present, and it can comparatively easily be performed to find a map of a distant place.

However, if the scroll speed is changed at a plurality of steps like this, there was a disadvantage that the state of map scrolling was suddenly changed at the point of changing of the scroll speed and when choosing a map of a place near the position of changing of the speed, the display of the map in the target range was overpassed and delicate operation was difficult.

SUMMARY OF THE INVENTION

In view of such a point, an object of the present invention is to make it possible to successfully perform the scroll when scrolling the display range of a map.

According to an aspect of the present invention, a map display signal generating method in which a specified range of data are read out from prepared map data and a signal for display is generated, includes a scroll starting step for instructing a display range change, a scroll step for scrolling a map display range on the basis of the scroll starting step, and a scroll finishing step for finishing the scroll. A scroll speed in the scroll step is a continuous function relative to time.

DETAILED DESCRIPTION OF THE PREFERRED EMBODIMENT

An example of the present invention will be described below by referring to FIG. 3 to FIG. 10.

Figure 1:
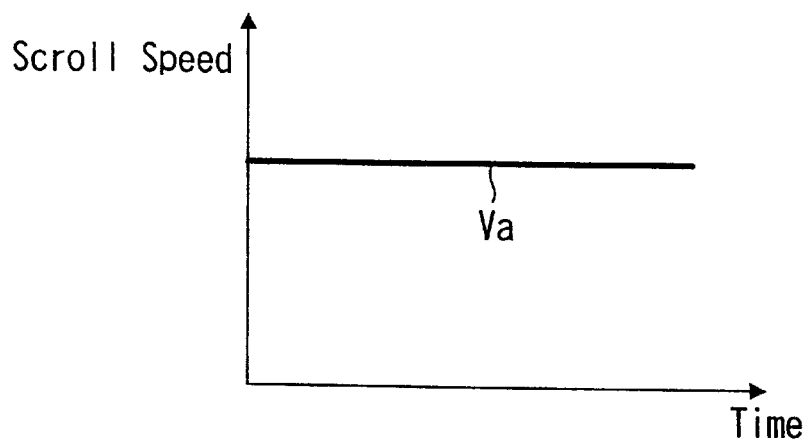
FIG. 1 is a graph showing an example of a prior art scrolling (scrolling speed is constant)
Figure 2:
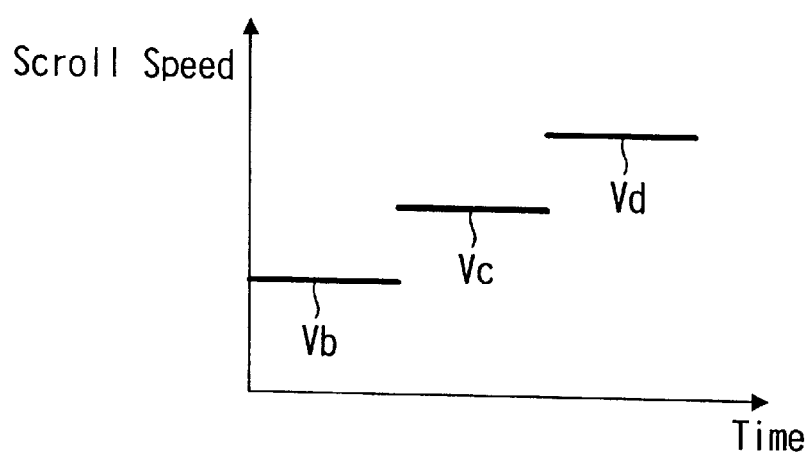
FIG. 2 is a graph showing an example of another prior art scrolling (scrolling speed has a plurality of steps)
Figure 3:
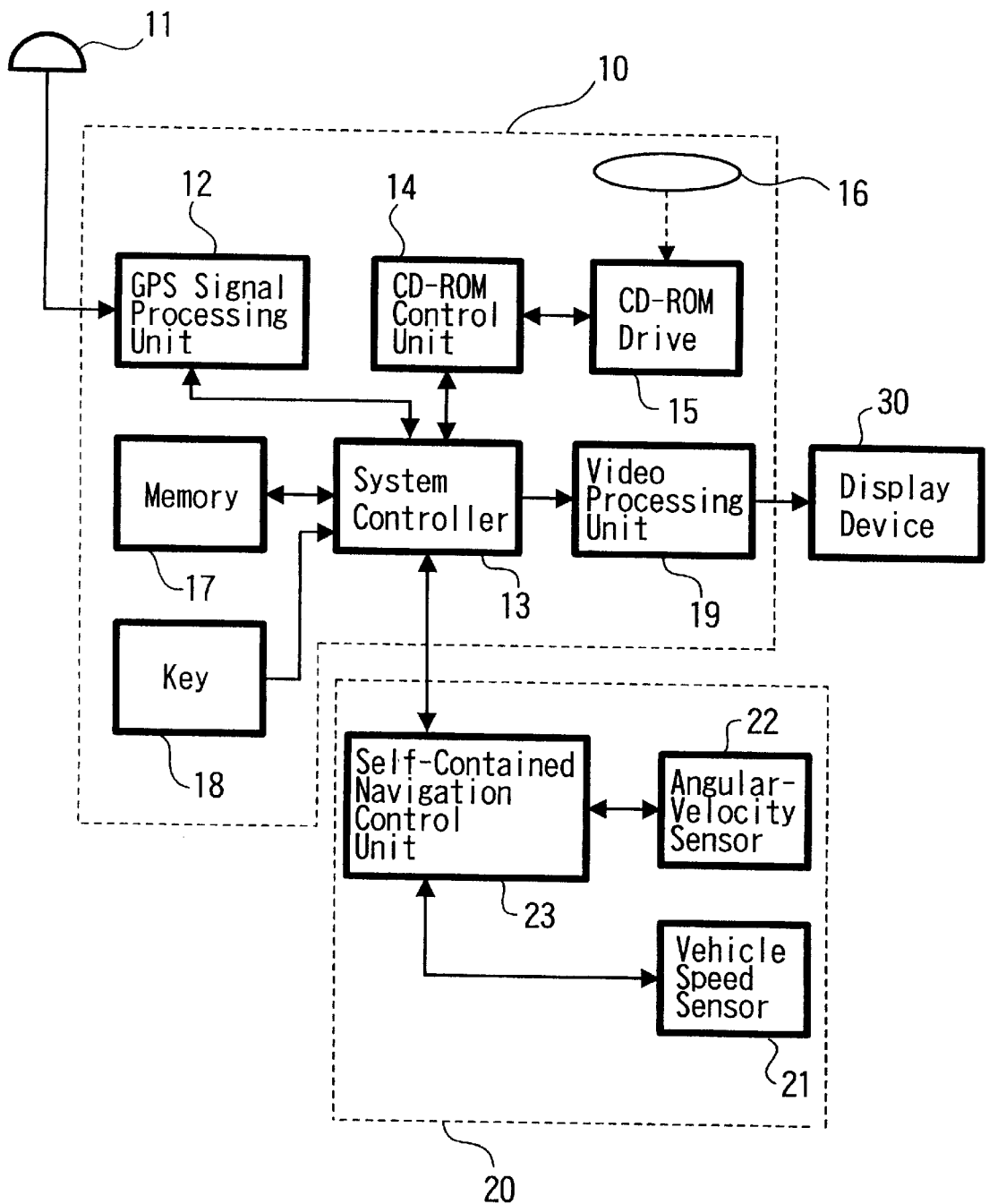
FIG. 3 is a block diagram showing an example of the present invention.

The present example is an example applied to a navigation device which is mounted on a movable body (here, an automobile) to be used, and the whole structure thereof is shown in FIG. 3. The navigation device is a device which is mounted on a movable body such as an automobile or the like to be used, but it can also be used as a map display device of an arbitrary place in a state where it is installed at a fixed place.

The structure of the navigation device of the present example will be described below with reference to FIG. 3. To a navigation device 10, a GPS antenna 11 is connected, and the signal received by the antenna 11 is supplied to a GPS signal processing section 12. In the GPS signal processing section 12, receiving processing for a positioning system called GPS (Global Positioning System) is performed. That is, the positioning signals for the GPS transmitted from a plurality of positioning artificial satellites are received, and the data contained in the signals are analyzed, and the data on a present position (latitude, longitude, altitude) are obtained. The data at the present position obtained in the GPS signal processing section 12 are supplied to a system controller 13.

The system controller 13 is a controller for performing the control to display the road map of a place near the present position measured, and when the measured data of the position are obtained from the GPS signal processing section 12, it sends a command to read out the road map of a position near the corresponding position to a CD-ROM control section 14. The CD-ROM control section 14 is a control section which controls the reading-out of the map data from a CD-ROM 16 (here, as a map disc in which road map data are recorded) mounted in a CD-ROM driver 15, and it stores the read-out map data in a memory 17 connected to the system controller 13.

The road map data stored in the map disc 16 are, for example, composed of the data on the coordinate positions of the start point and the end point of each road, and the vector data connecting the start point and the end point. Furthermore, the attached data required when displaying the road map are also stored in the map disc 16.

When the map data read out from the map disc 16 are transferred to the memory 17, the system controller 13 performs the processing for drawing the road map in a predetermined range in the map data. Then, the road map data drawn to be predetermined picture data are supplied to an image processing section 19, and are made to be a predetermined type of image signal for display (for example, RGB signal), and the image signal is supplied to a display device 30 connected to the navigation device 10, and the display device 30 displays the road map thereon.

Moreover, to the system controller 13, a key 18 which is an operation input section of the navigation device is connected, and a road map based on a mode set by the operation of the key 18 is displayed. For example, the display range, display scale, display direction and the like of the map can be set by the key input. In this case, as the key 18, a cursor key which can be operated in the vertical direction and in the horizontal direction is provided, and by the operation of the cursor key, the display range of the displayed map can be scrolled in the instructed direction.

Furthermore, to the navigation device 10 of the present example, an autonomic navigation unit 20 is connected, and even in a case where the GPS positioning signal from the artificial satellite cannot be received because of some reason, positioning is possible. That is, the autonomic navigation unit 20 comprises a car speed sensor 21 which counts a car speed pulse proportional to the car speed outputted from an engine control computer of an automobile or the like, an angular velocity sensor 22 composed of a gyro sensor, and an autonomic navigation control section 23 for measuring a present position on the basis of the outputs of both the sensors 21, 22, so that the present position may be measured. The results of the measurement are supplied to the system controller 13 of the navigation device 10.

Figure 4:
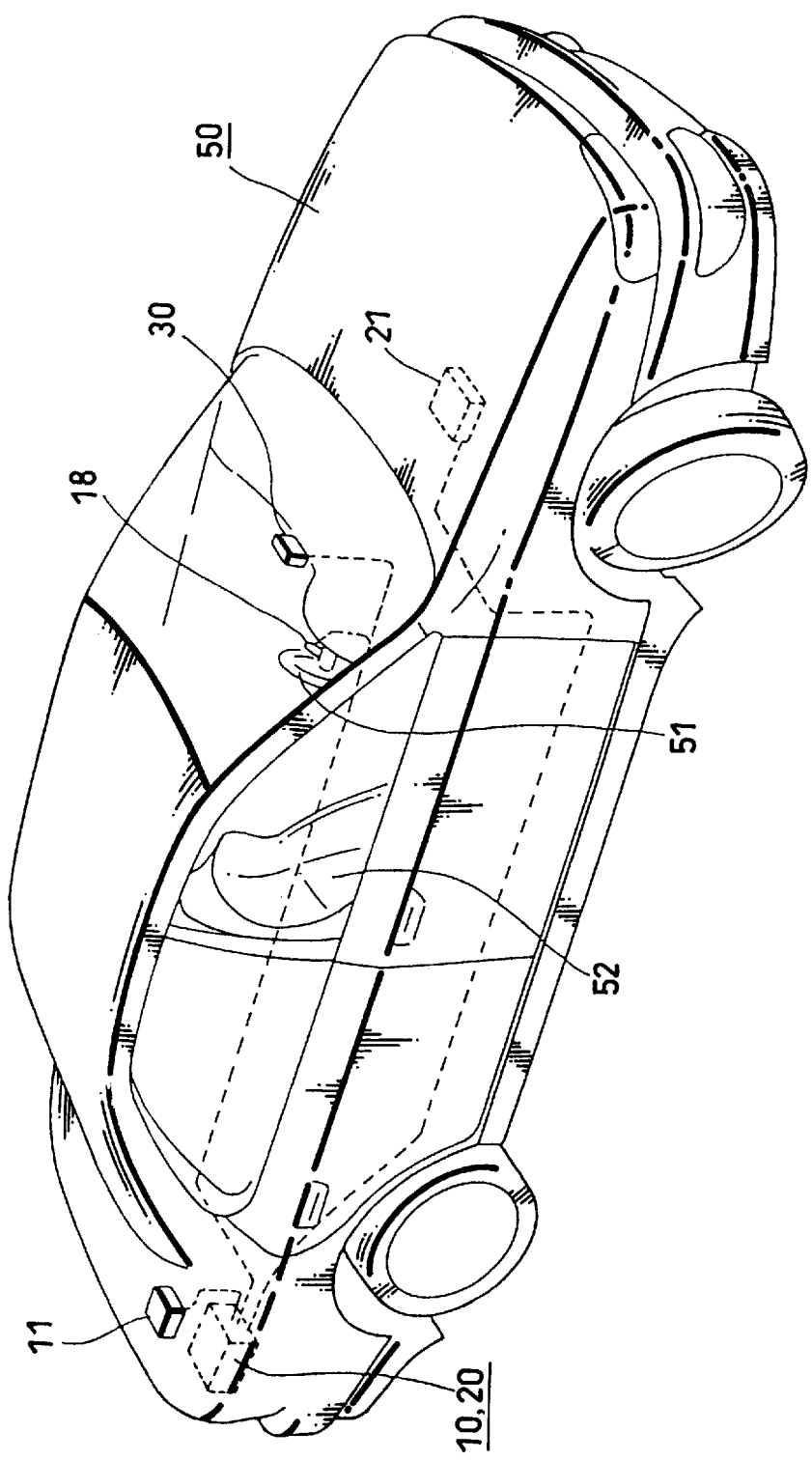
FIG. 4 is a perspective view showing a state where a device of the example of the present invention is mounted on an automobile.

Here, one example of the state where the navigation device 10 of the present example is mounted on an automobile, will be described with reference to FIG. 4 and FIG. 5. As shown in FIG. 4, the navigation device 10 and the autonomic navigation unit 20 are fixed in a predetermined space such as a trunk or the like of an automobile 50, and on a dashboard beside a steering wheel 51 in front of a driver seat 52, the display device 30 composed of a liquid crystal picture display device or the like is located. Here, the key 18 is attached to a position beside the steering wheel 51. Furthermore, the car speed sensor 21 of the autonomic navigation unit 20 is attached to an engine control computer (not shown in the figure) in an engine compartment.

Figure 5:
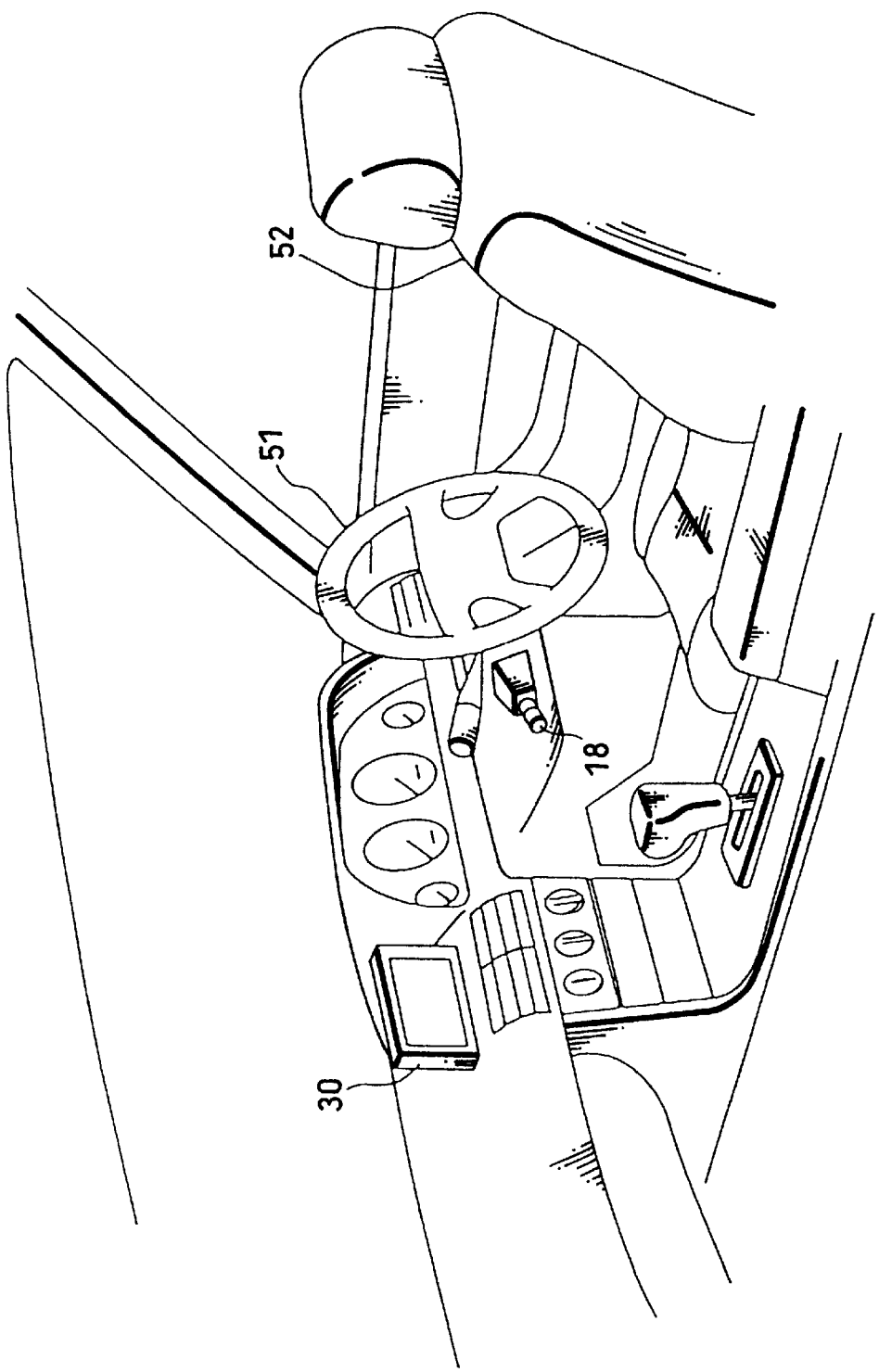
FIG. 5 is a perspective view showing a place near a driver seat in a case where the device of the example of the present invention is mounted on the automobile.

FIG. 5 is a diagram showing the state of the place near the driver seat 52. The display device 30 is installed so that a person sitting on the driver seat 52 may confirm the display of the display device 30 in the state where the forward visibility is not obstructed. Furthermore, the key 18 is made to be a so-called joystick type and is located beside the steering wheel 51 so that it may easily be operated during driving.

Figure 6:
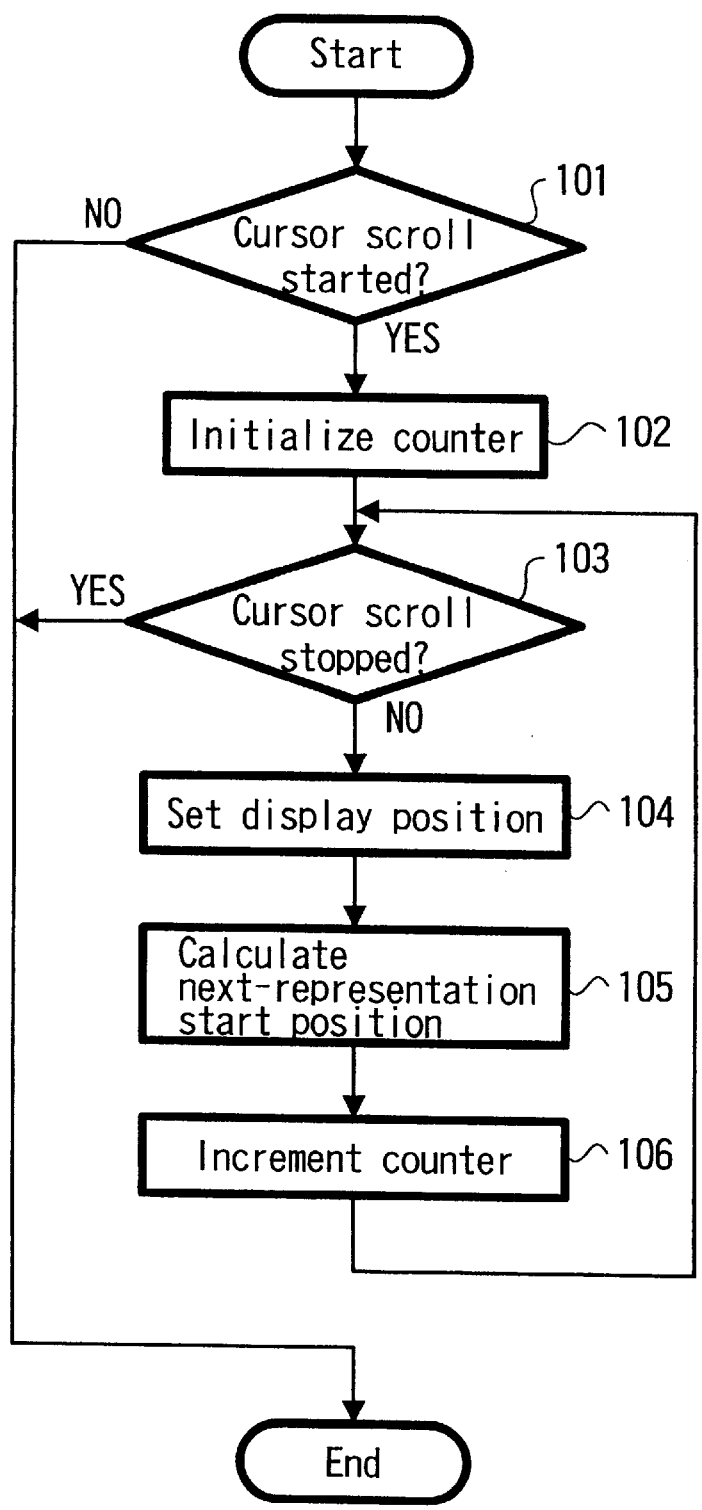
FIG. 6 is a flow chart showing the scrolling processing of a map display according to the example.

Next, the processing performed when displaying the road map by the navigation device of the present example will be described by referring to FIG. 6 and afterward. Here, the description will be given, centered at the processing in the case of scrolling the displayed range. The flow chart in FIG. 6 is a chart showing the processing based on the control of the system controller 13 in the case of scrolling the display range. The processing will be described below. In a circuit section for judging the key operation in the system controller 13, whether a scroll key is in the ON state or not is judged, in a state where a certain range of the road map is displayed on a screen of the display device 30 (step 101). Here, when the scroll key is judged to be in the ON state, the value of a counter in the system controller 13 is initialized so as to start scrolling (step 102). The counter is a counter to advance its count value according to the elapsed time, and a scroll speed (travel distance of the display range) in the display range corresponding to the count value is set. After that, whether the scroll key is in the OFF state or not is judged (step 103), and when the scroll key is judged to be in the OFF state, the scrolling is stopped and the operation is finished.

In the circuit section for controlling the drawing of a map in the system controller 13, when it is judged that the start of scrolling is instructed and the stop of scrolling is not yet instructed, the display start position is set on the basis of the count value at that time (step 104), and the drawing of a road map at the set display start position is performed. Then, the calculation of the position to start the display next is performed (step 105), and after that, the above counter is subjected to increment for calculating the display position of next time (step 106). Then, the process returns to the step 103.

Figure 7:
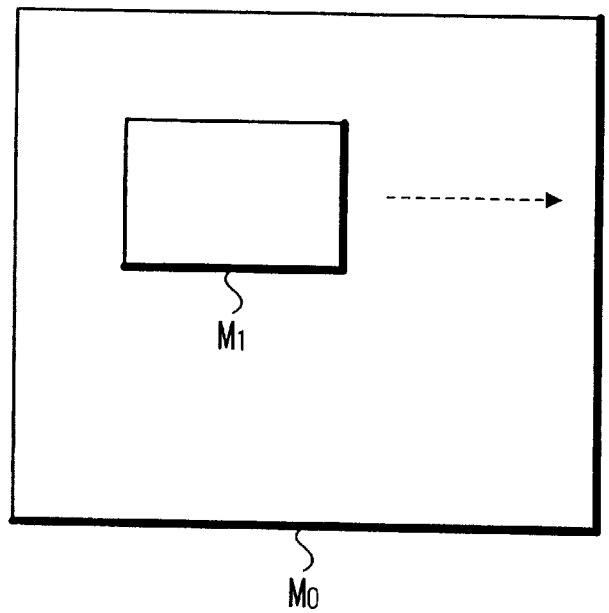
FIG. 7 is a diagram showing the display range setting state according to the example.

By being processed like this, the display range of a map can be scrolled on the basis of the operation of a cursor key, and the scroll speed can be changed. Furthermore, in a case where the scroll processing in the display range of a map by the control of the system controller 13 is performed, for example, as for the reading-out of the road map data from the map disc 16, as shown in FIG. 7, an area $M_O$ wider than a display area $M_1$ of a map displayed at present is read out to be transferred to the memory 17, and after that, the display area $M_1$ of the road map is set in the area $M_O$, and by using the road map data of the display area $M_1$, the drawing processing of the road map is performed. Then, as described by the flow chart in FIG. 6, when scrolling is instructed, the display area $M_1$ is changed successively in the instructed direction, as shown by the broken line arrow. Then, in a case where the scrolling is performed, exceeding the area $M_O$ of the prepared road map data, that data are newly read out from the map disc 16 and are transferred to the memory 17.

Figure 8:
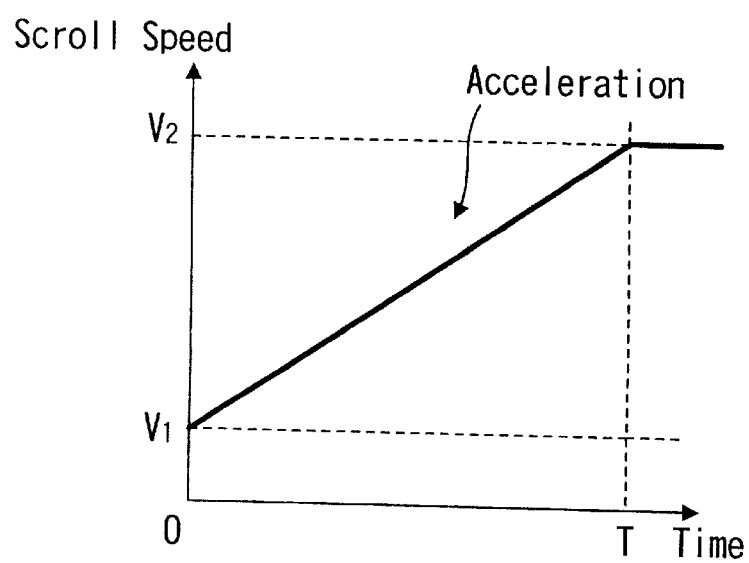
FIG. 8 is a graph showing the scrolling speed setting state according to the example.

Thus, the scrolling of the display range is performed, and in the present example, the scrolling speed is set as shown in FIG. 8. The horizontal axis in FIG. 8 shows a time t elapsed after the pressing of the cursor key, and at the start time of the pressing of the cursor key, a velocity $V_1$ (hereafter, the velocity $V_1$ is called an initial velocity) is set as the scrolling velocity v, and until a certain period of time T has been elapsed after the start time of pressing, the scrolling speed is increased at a constant acceleration $a_o$. The processing of increasing of the scrolling speed is performed by counting up the count value of the counter in the system controller 13, up to a terminal velocity $V_2$ after that until a state where the cursor key is not pressed and therefore the scrolling is no longer performed has come. Moreover, the acceleration $a_o$ is calculated by the following equation:

$$a_0 = \frac{V_2 - V_1}{T}$$

Figure 9:
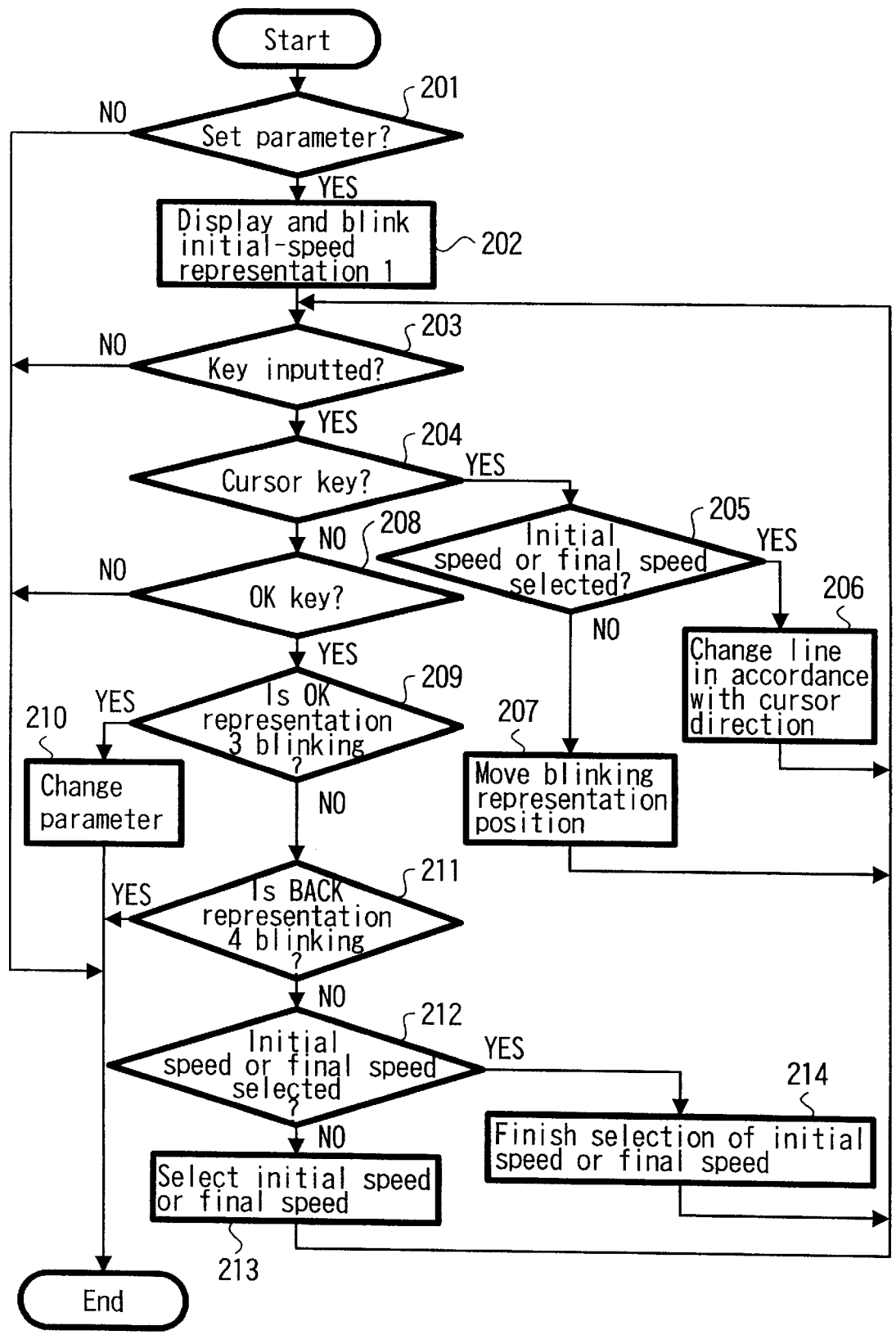
FIG. 9 is a flow chart showing the setting processing of parameters according to the example.
Figure 10:
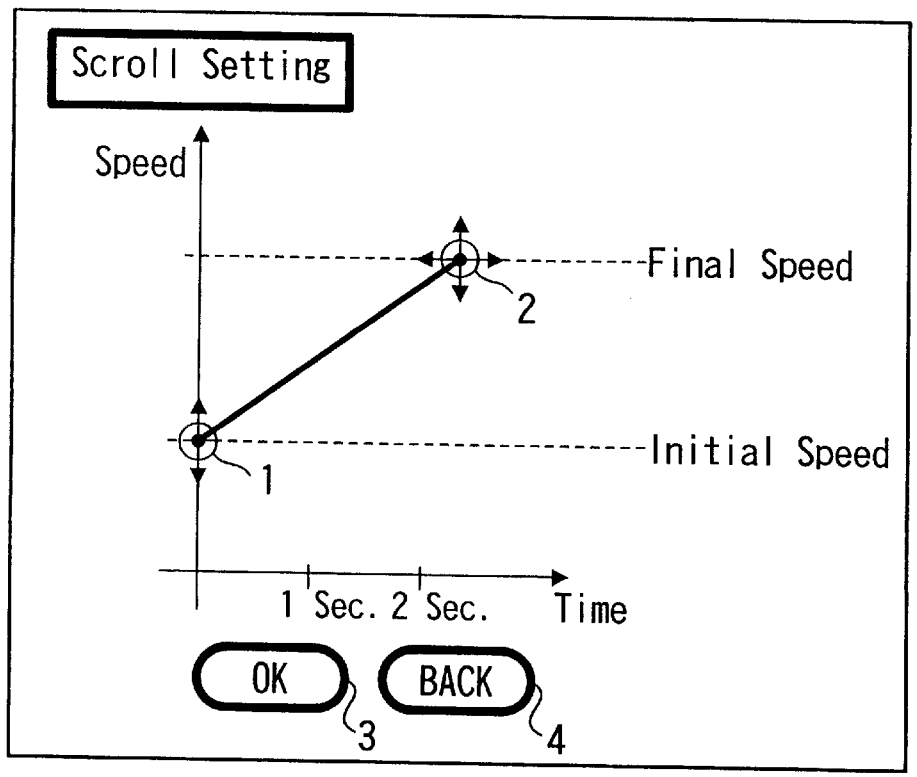
FIG. 10 is a diagram showing an example of the parameter setting screen according to the example.

Here, the initial velocity $V_1$, the terminal velocity $V_2$, and the acceleration $a_o$ may be previously set values, but in the navigation device of the present example, it is arranged that the user may freely set each value (called a parameter) thereof. The flow chart in FIG. 9 shows the setting processing of the parameters by the control of the system controller 13, and the processing will now be described. Whether the mode is a mode to perform the parameter setting or not is judged (step 201), and when the mode is judged to be a mode to perform the parameter setting, the control to display a parameter setting screen shown in FIG. 10 on the screen of the display device 30, is performed. In the parameter setting screen, an indication 1 of the initial speed (initial velocity) and an indication 2 of the terminal speed (terminal velocity) are shown on a graph having a horizontal axis as the time-axis at a second unit and a vertical axis as the velocity-axis. The positions of the indications 1, 2 show the set states of the present initial velocity and the terminal velocity. Furthermore, on the parameter setting screen, there are an indication 3 showing the determination and an indication 4 showing the returning.

Here, when the parameter setting screen is first displayed, the portion of the indication 1 of the initial velocity is indicated by flashing (step 202). Then, whether a key input exists or not is judged in that state (step 203), and if the key input exists, whether the key operation is an operation of a cursor key or not is judged (step 204). Then, if it is judged to be an operation of the cursor key, whether the state is a state where either the initial speed or the terminal speed is chosen by the operation of the cursor key or not is judged (step 205), and if either is judged to be chosen, the corresponding speed is fitted in the moving direction of the cursor and the display position of the indication 1 or 2 on the graph is changed (step 206). After the changing operation, the process returns to the step 203. At the step 205, if the state is not judged to be a state where either the initial speed or the terminal speed is chosen, the position indicated by flashing is moved (step 207). For example, in the first state, the indication 1 of the initial speed set at the step 202 is a position indicated by flashing, but the position is moved to the indication 2 of the terminal speed. After the movement of the position indicated by flashing, the process returns to the step 203.

Then, at the step 204 if the key operation is not judged to be an operation of the cursor key, whether it is an operation of a determination key or not is judged (step 208). Here, if it is judged to be an operation of the determination key, whether the indication 3 of the determination is flashing or not is judged (step 209), and if the state is judged to be a state where the indication 3 of the determination is flashing, the value of each of the parameters (initial speed, terminal speed, acceleration) is changed to the state instructed at that time, and the parameter setting mode is finished (step 210).

At the step 209, if the indication 3 of the determination is not judged to be flashing, whether the indication 4 to indicate the returning is flashing or not is judged (step 211), and if the indication 4 to indicate the returning is flashing, the parameter setting mode is finished without changing the parameters.

At the step 211, if the indication 4 to indicate the returning is not judged to be flashing, whether the initial speed or the terminal speed is chosen or not (that is, whether the state is a state where the indication 1 or 2 is flashing, or not) is judged (step 212). If the state is not judged to be such a state, the initial speed or the terminal speed is chosen, and the process returns to the step 203 (step 213). If the state is judged to be a state where the initial speed or the terminal speed is chosen, the selection of the initial speed or the terminal speed is released and the process returns to the step 203 (step 214).

Figure 11:
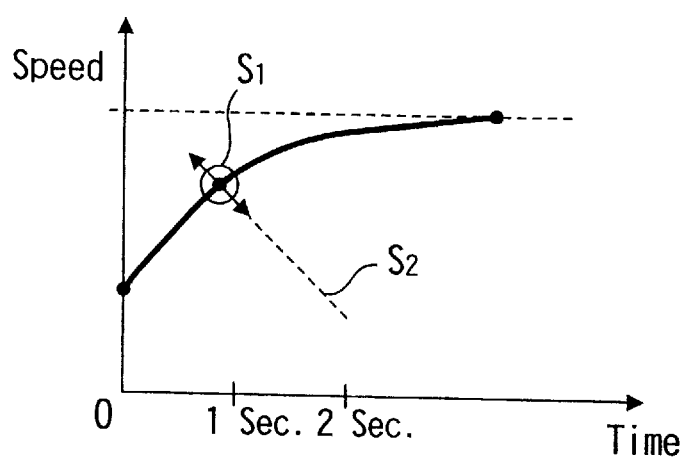
FIG. 11 is a graph showing another example of the parameter setting screen according to the example.

Thus, by choosing the initial speed and the terminal speed as the parameter setting mode, an arbitrary scrolling state can be set. The acceleration during the scrolling is automatically set to the corresponding value by the setting of the initial speed and the terminal speed on the graph. Furthermore, it is also possible that for example, one of the initial speed and the terminal speed is made to be a fixed value and only the other speed may be freely set. Alternately, it is also possible that both the initial speed and the terminal speed are made to be fixed values and only the acceleration may be chosen. That example is shown in FIG. 11. Furthermore, it is also possible that instead of making it possible to perform free setting in the parameter setting screen shown in FIG. 10 and FIG. 11, various types of parameter setting states are previously prepared and the selection among them may be performed.

As described above, if the navigation device of the present example is used, when scrolling the screen displayed as a map, the scrolling speed is gradually increased proportionally to the time of the operation of the cursor key, and both in a case where the position fitting of a short distance such as the goal setting or the setting of various types of marks, is performed and in a case where the scrolling of a long distance such as the retrieving of the goal or the confirmation of the route to the goal, is performed, a comfortable operating environment is given. Especially, since there is no so-called joint in the changing of the scrolling speed, a smooth display condition is ensured.

Furthermore, in the case of the present example, as described in a flow chart of FIG. 9, since the initial speed and the terminal speed are chosen as the parameter setting mode, an arbitrary scrolling state can be set, and a comfortable operating environment in which the user may more easily use the devices, can be set.

In the above mentioned example, the invention is applied in the case where a road map is displayed by a navigation device mounted on an automobile, but it can also be applied in the case where the map display is performed by navigation devices mounted on other movable bodies, and, of course, it can also be applied in the case where the map display range is scrolled by an electronic map display device other than the navigation device.

According to the present invention, the scrolling speed is gradually increased corresponding to the operation time, and so-called joints in the changing of the scrolling speed are removed, and an operation environment comfortable for the user is given, and a map at a desired position can satisfactorily be displayed.

In this case, since it is arranged that at least one of the initial speed, the acceleration, and the terminal speed can be set to be variable by a specified operation, the state can be set to be a state where the user may easily operate the devices, and a more comfortable operating environment can be given.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A map display signal generating method in which a specified range of data is read out from prepared map data and a signal for display is generated, comprising:
    a scroll starting step for instructing a display range change;
    a scroll step for scrolling a map display range on a basis of the instruction in said scroll starting step;
    a scroll finishing step for finishing said scrolling,
    wherein a scroll speed in said scroll step is a continuous function relative to time and an acceleration in said scrolling is constant; and
    a parameter designating step for designating at least one of a starting speed and a finishing speed of said scrolling, wherein said parameter designating step presents a graph-like display mode having axes of time and speed.

2. A map display signal generating method as claimed in claim 1, wherein said parameter designating step also designates the acceleration of said scrolling.

3. A map display method in which a specified range of data is read out from prepared map data and is displayed, comprising:
    a scroll starting step for instructing a display range change;
    a scroll step for scrolling a map display range on a basis of the instruction in said scroll starting step;
    a scroll finishing step for finishing said scrolling,
    wherein a scroll speed in said scroll step is a continuous function relative to time and an acceleration in said scrolling is constant; and
    a parameter designating step for designating at least one of a starting speed and a finishing speed of said scrolling, wherein said parameter designating step presents a graph-like display mode having axes of time and speed.

4. A map display method as claimed in claim 3, wherein said parameter designating step also designates an acceleration of said scrolling.

5. A map display device in which a specified range of data is read out from prepared map data and is displayed, comprising:
    an operating section for designating a display range and a scrolling state;
    a control section for controlling an operation based on a display parameter signal from said operating section;
    a map data reading section for reading in map data based on a read map data control signal from said control section;
    a display section for displaying said map data based on a display map control signal from said control section in a specified mode,
    wherein said control section instructs a display range change, scrolls a map display range, and finishes the scrolling, based on said map parameter signal from said operating section, and a scroll speed of the scrolling is a continuous function relative to time and an acceleration in the scrolling is constant; and
    parameter designating means for designating at least one of a starting speed and a finishing speed of the scrolling, wherein said parameter designating means presents a graph-like display mode having axes of time and speed.

6. A map display device as claimed in claim 5, wherein said parameter designating means also designates an acceleration of the scrolling.

7. A navigation device in which a present position is measured and a specified range of data is read out from prepared map data and is displayed, comprising:
    a measuring section for measuring a present position;
    an operating section for designating a display range and a scrolling state;
    a control section for controlling an operation based on a display parameter signal from said operating section;
    a map data reading section for reading in map data based on a read map data control signal from said control section;
    a display section for displaying said map data based on a display map control signal from said control section in a specified mode,
    wherein said control section instructs a display range change, scrolls a map display range, and finishes the scrolling, based on said display parameter signal from said operating section, and a scroll speed of the scrolling is a continuous function relative to time and an acceleration in the scrolling is constant; and
    parameter designating means for designating at least one of a starting speed and a finishing speed of the scrolling, wherein said parameter designating means presents a graph-like display mode having axes of time and speed.

8. A navigation device as claimed in claim 7, wherein said parameter designating means also designates an acceleration of the scrolling.

9. An automobile equipped with a map display section by which data of a specified range are read out from map data and are displayed, said map display section comprising:
    an operation section for designating a display range and a scrolling state;
    a control section for controlling an operation based on a display parameter signal from said operating section;

a map data reading section for reading in map data based on a read map data control signal from said control section in a specified mode, a display section for displaying said map data based on a display map control signal from said control section in a specified mode, wherein said control section instructs a display range change, scrolls a map display range, and finishes the scrolling, based on said display parameter signal from said operating section, and a scroll speed of the scrolling is a continuous function relative to time and an acceleration in the scrolling is constant; and parameter designating means for designating at least one of a starting speed and a finishing speed of the scrolling, wherein said parameter designating means presents a graph-like display mode having axes of time and speed.

10. An automobile as claimed in claim 9, wherein said parameter designating means also designates an acceleration of the scrolling.

* * * * *